(12) United States Patent
Botke

(10) Patent No.: US 8,201,375 B2
(45) Date of Patent: Jun. 19, 2012

(54) MULTIFUNCTIONAL ENERGY MANAGEMENT BUILDING CLADDING

(76) Inventor: Matthew Murray Botke, Moorpark, CA (US)

(*) Notice: Subject to any disclaimer, the term of this patent is extended or adjusted under 35 U.S.C. 154(b) by 109 days.

(21) Appl. No.: 12/829,427

(22) Filed: Jul. 2, 2010

(65) Prior Publication Data
US 2011/0000152 A1 Jan. 6, 2011

Related U.S. Application Data

(60) Provisional application No. 61/270,033, filed on Jul. 3, 2009, provisional application No. 61/273,331, filed on Aug. 3, 2009.

(51) Int. Cl.
*E04D 1/00* (2006.01)
*E04D 1/10* (2006.01)
(52) U.S. Cl. .............. 52/535; 52/554; 52/90.1
(58) Field of Classification Search ............ 52/535, 52/554, 559, 533, 556, 74, 90.1, 80.1–80.2, 52/81.1–81.6, 245, 547, 637, 643
See application file for complete search history.

(56) References Cited

U.S. PATENT DOCUMENTS

| | | | | |
|---|---|---|---|---|
| 2,647,292 A | * | 8/1953 | Ruggles | 52/78 |
| 2,894,296 A | * | 7/1959 | Scoccia | 52/473 |
| 3,354,591 A | * | 11/1967 | Fuller | 52/81.2 |
| 3,420,024 A | * | 1/1969 | Salvo | 52/316 |
| 3,893,277 A | * | 7/1975 | Constant | 52/630 |
| 5,456,555 A | * | 10/1995 | Bokeler | 405/286 |
| 5,906,083 A | * | 5/1999 | Olsen et al. | 52/473 |
| 7,493,734 B2 | * | 2/2009 | Kramer | 52/554 |
| 7,921,843 B1 | * | 4/2011 | Rawlings | 126/623 |
| 7,975,450 B2 | * | 7/2011 | Kramer | 52/554 |

* cited by examiner

*Primary Examiner* — Jeanette E. Chapman
(74) *Attorney, Agent, or Firm* — Mark Rodgers

(57) ABSTRACT

This invention relates to a building cladding for inclined surfaces such as for a sloped roof. More specifically, this invention relates to a building cladding that is passively responsive to sun elevation angles, is multi-functional, and is substantially uniformly ornamental when viewed from common viewing positions. The cladding is predominantly comprised of pairs of substantially horizontal and vertical surfaces extended horizontally and repeated vertically or along the incline of the building substrate. Substantially horizontal surfaces may be adapted for absorbing solar energy, reflecting solar energy, generating electricity from solar energy, converting solar energy into another form of energy, and or ornamentally matching substantially vertical surfaces.

2 Claims, 12 Drawing Sheets

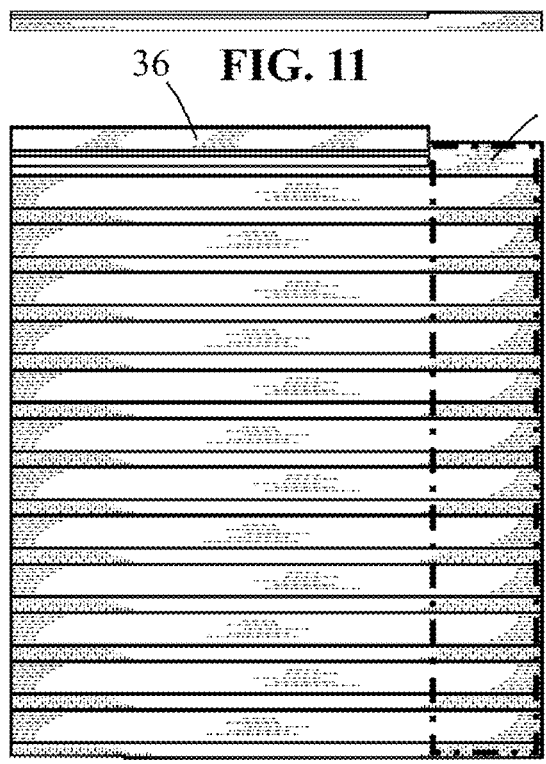
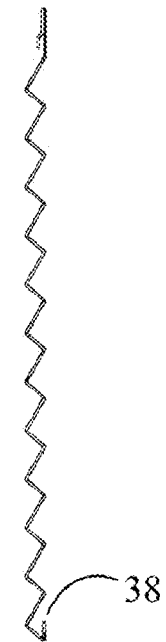
FIG. 11
FIG. 10     FIG. 13
FIG. 12
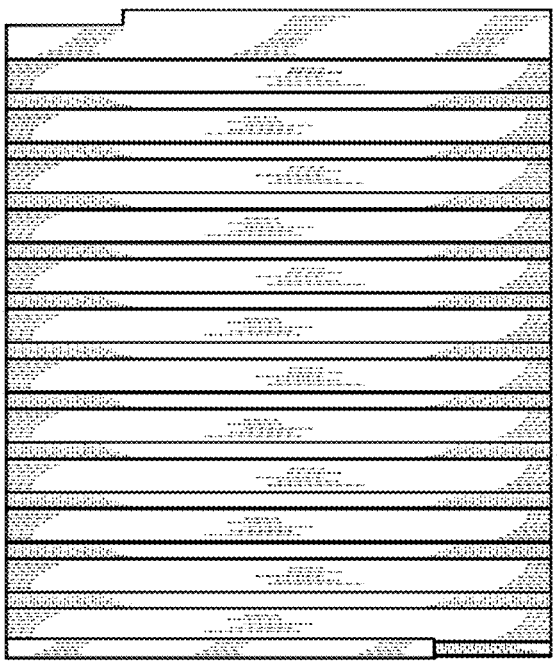
FIG. 14

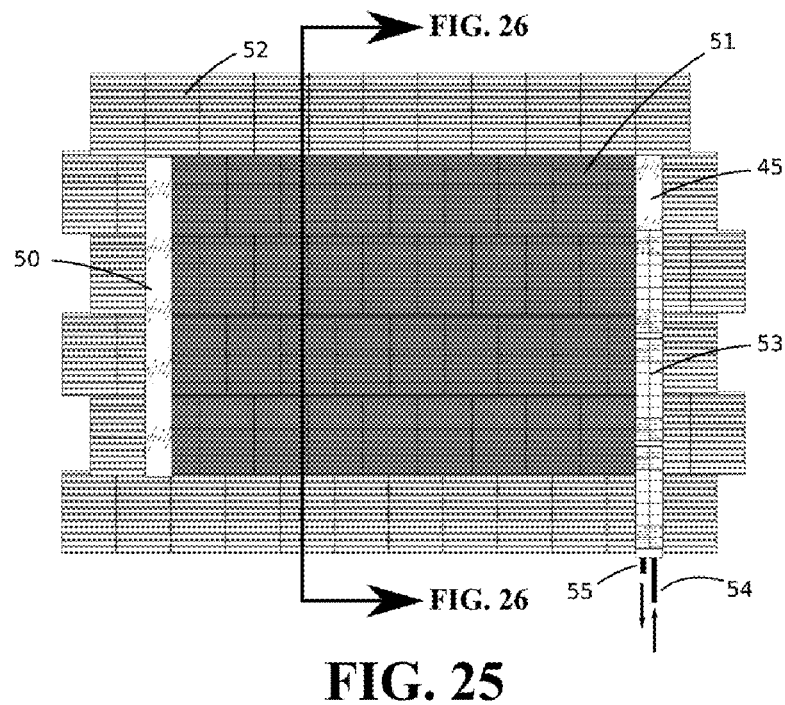
FIG. 25
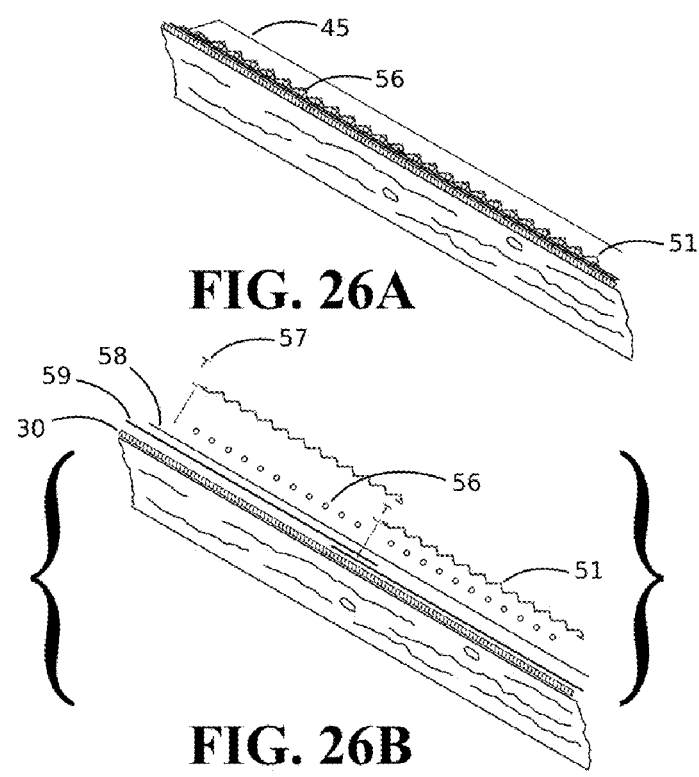
FIG. 26A
FIG. 26B

MULTIFUNCTIONAL ENERGY MANAGEMENT BUILDING CLADDING

CROSS REFERENCE TO RELATED APPLICATIONS

I claim the benefit of the following applications;
U.S. Provisional Application No. 61/270,033 filed on Jul. 3, 2009 entitled Reflective Building Element According to Sun Angles with High Emissivity
U.S. Provisional Application No. 61/273,331 filed on Aug. 3, 2009 entitled Building Integrated Solar Energy Management Cladding and Method Thereof

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

REFERENCE TO SEQUENCE LISTING, A TABLE OR A COMPUTER PROGRAM LISTING COMPACT DISC APPENDIX

Not Applicable

BACKGROUND OF THE INVENTION

This invention relates to an outer covering or cladding of a building envelope for inclined surfaces such as for a sloped roof. More specifically, this invention relates to a multi-functional cladding passively responsive to sun elevation angles and substantially uniformly ornamental when viewed from common viewing positions. This invention also relates to means and methods to collect, transport, and utilize energy throughout the cladding system. The building envelope includes the walls, roof, windows, and doors of a structure and includes the weather protective surface of the building. The envelope performs many functions including minimizing heat energy transfer between the interior conditioned space and the environment, resisting degradation due to weathering effects as well as presenting an ornamentally appealing surface. Heat energy transfer through the building envelope changes the temperature of the conditioned space. Energy must be expended to maintain the desired temperature of the conditioned space in order to offset energy transfer to or from the environment. Therefore, minimal energy transfer across the envelope is desirable. The rate of energy transfer across the building envelope becomes significant when large temperature differences exist between the ambient environment and the conditioned space. Building environmental systems must be sized according to maximum expected demands in order to ensure comfort levels are maintained. A primary source of heat energy loading on the envelope is due to the absorption of direct solar radiation and secondarily due to the absorption of diffuse solar radiation into the exposed surfaces of the envelope. The outer surface of the envelope is comprised of a cladding system by which tiles, panels, bricks or tiles are arranged over the building substrate in order to provide a contiguous weather resistant layer. Characteristics by which the cladding interacts with incident solar radiation have significant affect on the heat transfer between the interior conditioned space and the outside environment. Minimizing solar heat gain into the conditioned space in summer reduces energy demand on cooling equipment. Maximizing solar heat gain in winter reduces energy demand on heating equipment. Traditionally, the energy required to cool a conditioned space is more expensive than the equivalent energy required for heating the same space due to the type of energy required for each application. Heating is typically accomplished by burning fossil fuel while cooling is typically accomplished using more costly electrical energy. Therefore, envelope performance is designed to minimize solar heat gain in the summer and secondarily to maximize solar heat gain in the winter for much of the globe between about 50-deg North and 50-deg South latitude.

Elevation and azimuth sun angles vary according to time of year, time of day, and the positional latitude on the Earth from which the angles are measured. During summer and especially at summer solstice, the sun is at a higher elevation angle and for longer periods of time during the day than during winter and especially at winter solstice. Peak heating occurs in the hours surrounding solar noon when the elevation angle of the sun is at or near the daily maximum. Energy use to cool a conditioned space in the summer most often reaches a maximum in the early afternoon as a result of the energy absorbed into the active thermal mass of the envelope during the times surrounding solar noon. FIG. 1 illustrates the daily sun path across the sky and throughout the year as measured at 34-deg North latitude and is referred to as a sunpath diagram. The sunpath diagram charts elevation angle (1) and azimuth angle (2) of the sun (3) from winter solstice (5) to summer solstice (4) throughout the day. During summer solstice, the sun elevation angle remains above 40-deg for over seven hours. By comparison, during winter solstice (5) the sun reaches a maximum of only approximately 35-deg elevation angle at solar noon. A cladding system that is responsive to sun elevation angles enables substantial reductions in energy use especially during the cooling season. Both U.S. Pat. No. 3,001,331 granted to Brunton and U.S. Pat. No. 5,511,537 granted to Hively describe cladding methods passively responsive to sun elevation angles each with disadvantages to the present invention disclosed herein.

Energy transfer across the building envelope can be effectively mitigated by the cladding including surface geometry as well as thermal and thermo-optical properties. Some relevant properties according to the present invention are;

a. reflectivity, which relates to the non-wavelength dependent total fraction of incident solar radiation reflected and is measured on a scale of 0 to 1, whereas 1 is a perfect reflector and;

b. transmissibility, which relates to the non-wavelength dependent transmission of solar radiation measured through transparent materials and is measured on a scale of 0 to 1, whereas 1 is perfectly transparent and;

c. absorptivity, which herein relates to the non-wavelength dependent fraction of incident solar radiation not reflected or transmitted and is measured on a scale of 0 to 1, whereas 1 is a perfect absorber and;

d. emissivity, which relates to the non-wavelength dependent effectiveness of emitting or radiating absorbed energy to the surroundings for a given temperature difference between the cladding and surroundings assuming optically thick materials and is measured on a scale of 0 to 1, whereas 1 is a perfect blackbody emitter and;

e. thermal capacitance per unit mass which relates to the temperature rise of the materials for a given unit of energy input and;

f. thermal conductivity, which relates to the time rate of heat energy conducted through materials and into or out of surroundings in physical contact.

Since even highly reflective materials absorb some solar radiation, building materials including cladding systems can be advantageously designed to manage the absorbed heat energy. Absorbed heat energy raises the cladding temperature in proportion to the thermal capacity and thermal mass of the cladding. The energy is then typically transferred through conduction and radiation into the building substrate, re-radiated into the surroundings, and or transferred through convection to the air. Roof cladding comprised of a low emissivity surface exposed to the environment will reach a higher peak temperature compared to a similar roof cladding with higher emissivity resulting in increased local air temperature through convective heat transference. The effects of local air heating in regions with a high proportion of absorbing surfaces such as in developed areas is known as the Heat Island Effect and can be a significant source of heat gain into buildings as well as result in decreased air quality.

Both high reflectivity and high emissivity improve the effectiveness of building cladding to reject solar gain just as high absorptivity and low emissivity increase solar gain. Metals traditionally used for building construction such as cladding include bright zinc galvanized steel (emissivity=0.23 to 0.28), aluminum (emissivity=0.02 to 0.19) and stainless steel (emissivity=0.08 to 0.20). While bare metals are excellent reflectors, these materials do not effectively emit heat energy compared to other building materials such as paint and masonry (emissivity>0.70). Therefore, a cladding system with a bare metal coating exposed to radiant energy will increase in temperature more than would occur for an otherwise equivalent cladding system with a more emissive coating exposed to equivalent radiant energy. Several disadvantages occur as a result of using polished bare metal as a cladding surface such as that described in U.S. Pat. No. 3,001,331 granted to Brunton. The cladding is subjected to larger temperature cycling amplitudes, which degrade the useful life of the system. Local air temperatures increase and air quality decreases as cladding surface temperatures increase. Also, higher cladding temperatures increase the thermal gradient between the inside and outside of the building envelope causing an increase in energy transfer rate. The emissivity of a building cladding becomes more important as the heat capacitance or thermal mass of the cladding is reduced such as that described in U.S. Pat. No. 3,001,331 granted to Brunton. A low thermal mass building cladding increases in temperature greater than that of an otherwise equivalent higher thermal mass building cladding for an equal quantity of energy absorbed. A cladding that both reflects a large fraction of the incident solar energy such as about 0.6 and emits a high fraction of the absorbed solar energy such as about 0.7 back into the environment will be subjected to a lower temperature cycling amplitude compared to the referenced art of equivalent thermal capacity in an identical environment. Limiting the temperature cycling amplitude increases cladding useful life and so is a desirable property of a building cladding. Another disadvantage of the referenced art is that polished metal surfaces must be chosen to withstand the effects of the environment without degrading appreciably in reflectivity, which further limits the applicability in both choice of material and economical manufacturing for a reflective surface. Metals such as copper, iron, steel and aluminum for example do not remain bright when exposed to the weathering effects of the environment unless sufficiently protected with a coating. The layer that develops on the metal surface over time, such as the patina or oxide layer both decreases reflectivity and increases reflectivity. Materials such as bare copper and carbon steel are best suited for substantially vertical surfaces as an ornamental and absorptive surface after a short period of time when exposed to the effects of the weather.

Cladding energy performance increases can be realized by the use of materials exposed to the environment that are greater than about 0.5 reflective and greater than about 0.5 emissive for surfaces designed to reject solar gain. As but some examples of suitable reflective and emissive coatings are light-colored paints, and polymer coatings such as UV stabilized white PVDF (Polyvinylidene Fluoride), epoxy paints pigmented with Titanium Oxides or synthetic pigments of similar reflectivity. The total emissivity of a combination of materials is greatly influenced by the emissivity of the exposed outer surface. Therefore, a sufficiently thick protective coating such as anodize or polymer sheeting applied to an efficient reflector such as a bare metal surface increases both the emissivity as well as the resistance to environmental degradation. Metals with a reflectivity greater than about 0.5 in combination with such a protective coating having greater than about 0.9 transmissibility and greater than 0.5 emissivity functions as a second surface reflector is also a suitable choice. Even mixtures of metal particles in an emissive matrix can be effective reflective and emissive surfaces.

Minimizing energy transfer by thermal conduction between the underlying substrate and the cladding is accomplished by minimizing the surface area of the cladding in contact with the substrate. Minimizing radiation transfer between a reflective and emissive cladding and underlying substrate provides a further method of reducing heat energy transfer across the building envelope. Desirable properties of cladding surfaces exposed to the underlying substrate include high reflectivity such as about 0.5 or greater and low emissivity such as about 0.5 or lower, preferably below 0.3 to further reduce energy transfer between cladding and substrate. Bare metals such as bright zinc galvanized steel and aluminum are well suited for these surfaces.

Most available high reflectivity cladding systems have been incorporated into commercial roof structures, which typically comprise a large area fraction exposed to the sun and have nearly flat roofs that are not commonly visible. These types of roofs are not limited by ornamental requirements and most often are white or lighter in color. Buildings with inclined roofs such as residential structures benefit from the same technologies that have been developed for commercial structures. Many factors are involved when an architect or homeowner chooses a roof cladding for inclined roofs. Since darker roofs are traditionally preferred over lighter colored roofs, methods have been devised to create ornamental, high reflectivity cladding.

U.S. Pat. No. 5,511,537 granted to Hively describes a system in which two aspects negatively affect the functional performance and ornamental appearance as applied to an inclined building surface such as a roof; the overhanging vertical surface and the visible exposure of the reflective surface. An overhanging surface is not effectively self-cleaning except in heavy rains and therefore tend to trap debris. This often leads to degradation and discoloration from environmental fouling and thus results in reduced solar performance and negative ornamental appearance. Further, overhanging surfaces increase manufacturing complexity for molded cladding such as tiles. The exposure of the reflective surface sufficiently enough to be perceived in the visual field of people viewing the cladding from normal viewing positions creates a negative ornamental appearance. The published application WO 2006/1119567 A1 by Totoev discloses a similar cladding unit for a vertical surface such as a wall, which is also comprised of an overhanging surface and therefore manufactured by an extrusion process. The extruding process is capable of producing overhanging surfaces but not capable of producing features required for inclined surface cladding such as the side lap and gutter for tiles.

U.S. Pat. No. 5,303,525 granted to Magee is selectively reflective in response to sun angle. Although an object of the referenced art is to preserve ornamental appeal, the art as described relies on refraction and is therefore very sensitive to environmental fouling. Yet another method for increasing the reflectivity of darker colored cladding utilizes wavelength selective reflectivity in the infrared portion of the spectrum. A representative performance curve for such a system is illustrated as curve (10) of FIG. 2 where the X-axis is wavelength and the right side Y-axis is reflectivity. This technology preserves the visible color ornamental appearance of traditional roofs while being more reflective in the non-visible infrared portion of the spectrum (7). A disadvantage of this technology is that reflectivity is limited to approximately only one-half of the incident solar energy on the building. Curve (8) of FIG. 2 illustrates the normalized energy content on the left side Y-axis versus wavelength of incident solar radiation at ground level. The visible portion of the spectrum is illustrated in FIG. 2 as region (6). A higher performing material might have a performance curve such as that illustrated as curve (9) of FIG. 2 where both visible and infrared portions are effectively reflected such as by a white PVDF surface. Wavelength selective reflectivity addresses the importance of ornamental appeal for visible building cladding but does not exploit the advantages of sun angle responsive selective reflectivity. A preferable cladding rejects the greatest fraction of incident solar radiation during the cooling season while maximizing ornamental appeal.

The sloped roof portion of the building envelope of low-rise buildings represents a large fraction of the surface area exposed to direct solar radiation. Often, additional equipment is located on the roof such as photovoltaic panels and solar thermal panels. Traditionally, this equipment has not been well integrated to the cladding system but rather attached over the cladding system. Ornamental appeal is one consideration for the placement of these systems. As a result, equipment placement is often not ideal from a performance aspect and therefore operates at reduced effectiveness.

U.S. Pat. No. 4,111,188 granted to Murphy discloses modes of collecting solar energy throughout the building cladding such as to preserve ornamental uniformity. An advantage of the referenced art is that the cladding and thermal system are installed above the roof substrate and therefore may be installed easily as a retrofit. Published application US 2006/0288652 A1 by Gurr describes an ornamental electrically heated roof panel for preventing ice dams. A heated cladding and a solar energy collecting cladding can be the same cladding embodiment with the flow of energy established depending on intended use. The utilizing a common cladding system, a multifunctional cladding is possible, which simplifies system design and installation. Further, a cladding with surfaces that remain perceptibly hidden from view can be combined with an energy collecting, distribution, and or dissipating cladding that is multifunctional and that presents a uniformly ornamental appearance when viewed from common viewing positions.

BRIEF SUMMARY OF THE INVENTION

This invention relates to a cladding for buildings as shown in FIG. 3 and FIG. 4 adapted for inclined building surfaces such as roofs. More specifically, a building cladding is presented that is multifunctional as an effective solar absorber, solar reflector responsive to sun angle, solar reflector responsive to temperature, energy generator, ice dam preventing cladding, and or simply an ornamental cladding surface in any combination within the same clad building surface while presenting a uniform ornamental appearance. The cladding is passively responsive to sun elevation angles and therefore responsive to daily and seasonal changes in solar incident radiation. Several embodiments are shown in FIG. 8 through FIG. 23. The cladding according to this invention is illustrated in FIG. 24 through FIG. 31 as integral parts of several energy management systems. Cladding according to this invention may be adapted to system functions such as those described herein and then combined as needed within the same clad building surface while still preserving a uniform ornamental appearance.

A substantially horizontal surface (15) and a substantially vertical surface (14) form a pair of surfaces with a common edge (21), which repeat along the inclined building substrate, extend horizontally and comprise a high fraction of the surface of a building cladding. The substantially horizontal surface and substantially vertical surface may be tilted from the horizontal (25) and vertical (24) planes respectively for drainage. The horizontal surface of the cladding system may be designed to advantageously function in many modes by changing the outer surface properties without significant impact to the visible uniformity and therefore ornamental appeal of the clad building surface.

A South-facing sloped roof in the Northern hemisphere with cladding elements according to this invention present a view factor to the sun that varies from dawn, when the view factor is almost completely of the vertical surfaces, to a sun view factor comprised mostly of horizontal surfaces. The maximum view factor exposed to the sun of substantially horizontal surfaces increases as the sun elevation angle increases throughout the day and reaches the daily maximum at solar noon. The view factor exposed to the sun of substantially horizontal surfaces then decreases to a minimum at sunset. The time rate of change of the view factor area fraction of substantially horizontal surfaces is a function of many parameters including; latitude, roof slope, date of the year, and time of day. A cladding according to the present invention comprising substantially horizontal surfaces configured for high reflectivity and substantially vertical surfaces configured for low reflectivity will exhibit a sun elevation angle responsive composite reflectivity throughout the day.

An aspect of the invention is the method by which the horizontal surface (15) is sized and oriented with respect to the visual acuity limitations of the human eye resulting in a surface effectively hidden when viewed from normal viewing positions. Inclined building substrates such as roofs are commonly viewable (231) from known positions (22), which can be determined by the expected and or actual use of the building. Both the resolvable feature size and the viewable fraction of the substantially horizontal surface change as the observer position changes. The viewable fraction of the substantially horizontal surface generally increases as the resolvable feature size decreases for an inclined roof or similar building surface. A locus of points can be determined at which the maximum viewable fraction of the substantially horizontal surface equals the resolvable feature size. From within this locus of points, the substantially vertical surfaces represent nearly the entire field when viewed from standing at ground level. The slope angle and width of the substantially horizontal surfaces can then be determined to maximize drainage, minimize manufacturing complexity, reduce effects environmental fouling as well as satisfy other relevant design parameters. Any portion of cladding that can be viewed from uncommon positions such that substantially horizontal surfaces will be viewable may be ornamentally matched to substantially vertical surfaces. Typically, cladding regions close to the fascia (16) limit the maximum slope angle of the substantially horizontal surfaces. Further, the adjoining angle between substantially horizontal and substantially vertical surfaces may vary along the incline of the building surface. An angle varying cladding as described is effective in maintaining suitable feature sizes which is important during manufacture and especially when molding cladding elements.

Substantially horizontal surfaces may then be adapted to functions such as those disclosed herein without the traditional aesthetic and ornamental limitations of traditional cladding technologies for inclined, visible building surfaces. The substantially horizontal surface may be an effective solar reflector, solar heat absorber, electricity generator such as by photovoltaic devices, or even a surface that is reflectively responsive to temperature. The substantially horizontal surfaces may be comprised of any means to convert or utilize solar energy such as even by photochemical processes. Since the substantially horizontal surfaces are hidden from perceptible view of persons viewing from common viewing positions, the cladding presents a uniform ornamental aesthetic regardless of horizontal surface configuration.

In some embodiments currently contemplated, the cladding system is configured to generate electrical energy and or actively or passively transport absorbed heat energy away from the cladding system. This energy may be utilized immediately or stored for later utilization. It is also an aspect of this invention that heat energy or electrical energy for conversion to heat energy be transported into the cladding system for utilization such as for preventing or melting ice dams. It is a further aspect of this invention that an electrical generating system such as photovoltaic array or active heat transport system such as with a working fluid or air be easily integrated into the cladding system with minimal impact to ornamental appeal. Finally, the cladding and energy system may be accomplished as a retrofit without having to replace the underlying roof substrate.

BRIEF DESCRIPTION OF THE SEVERAL VIEWS OF THE DRAWINGS

FIG. 10 is a front view of the shingle in FIG. 8.

FIG. 11 is a top view of the shingle in FIG. 8.

FIG. 12 is bottom view of the shingle in FIG. 8.

FIG. 13 is a right side view of the shingle in FIG. 8.

FIG. 14 is a back view of the shingle in FIG. 8.

FIG. 25 is a top view of a cladding region as a roof.

FIG. 26 is a sectional view of the cladding region of FIG. 25 where FIG. 26A is a sectional view and FIG. 26B is an exploded sectional view of FIG. 26A.

DETAILED DESCRIPTION OF THE INVENTION

Embodiments of the present invention are currently contemplated as tiles and shingles. Panels such as standing seam panels are also currently contemplated. Cladding units with features added as a secondary process such as added in the field during installation on a building to accomplish the aspects of the invention are also currently contemplated. Tiles are typically constructed of stone, concrete or similar rigid material. Shingles are typically constructed of asphalt, metal, plastic or similar material in sheet form. Panels are typically larger cladding shingle units such as for use in standing seam metal roofs and can often be self-supporting. A plurality of cladding units is typically assembled into a system to provide a contiguous surface resistant to weathering effects and be sufficiently ornamental when commonly visible. It is an object of this invention that a building cladding responsive to sun elevation angle and multi-functional present a substantially uniformly ornamental appearance. Embodiments are disclosed herein to illustrate the various aspects of the invention and are not intended to be scope limiting to specified attributes such as feature sizes or ratios, coating selection, construction, materials and the like.

Winter solstice is characterized by a lowest annual sun (19) elevation angle (20) while summer solstice is characterized as the highest sun (17) elevation angle (18) at solar noon. A building cladding according to the present invention presents a predominantly dual surface composite view to the sun. The area fraction of each type of surface facing the sun varies with respect to sun elevation angle. At low sun elevation angles, the cladding presents largely a view factor to the sun of vertical surfaces. As the elevation angle increases throughout the day and season, the cladding presents a view factor to the sun increasingly comprised of horizontal surfaces.

Figure 1:
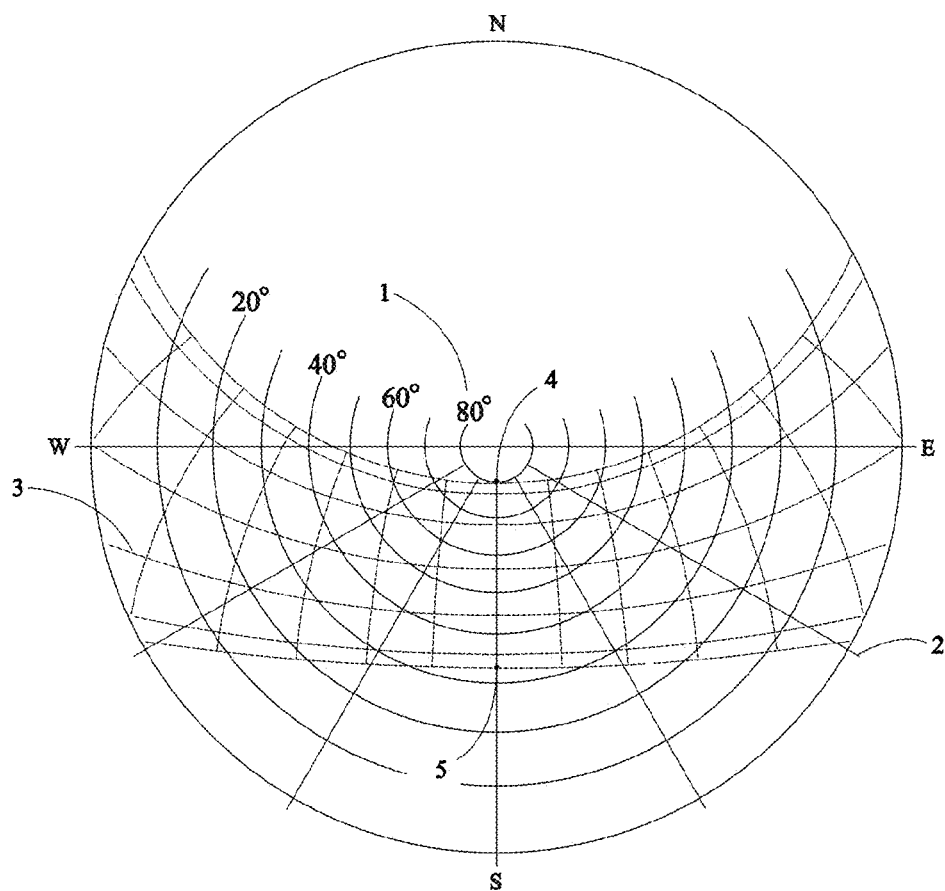
FIG. 1 is a sunpath diagram for 34-deg North latitude illustrating the hourly and seasonal path of the sun across the sky.
Figure 2:
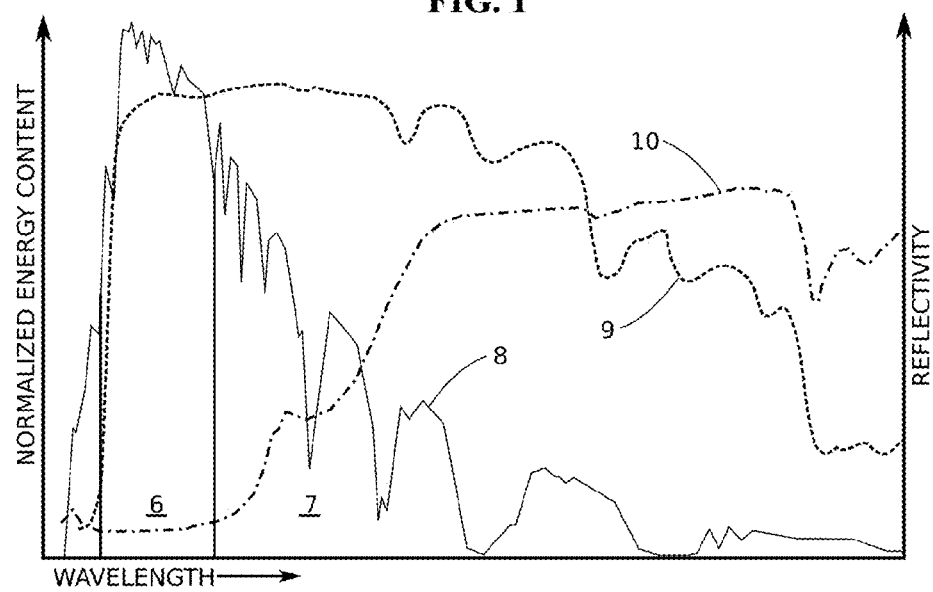
FIG. 2 is a graph of the normalized energy content of incident solar radiation on the surface of the Earth by wavelength and the reflectivity of two materials as a function of wavelength.
Figure 3:
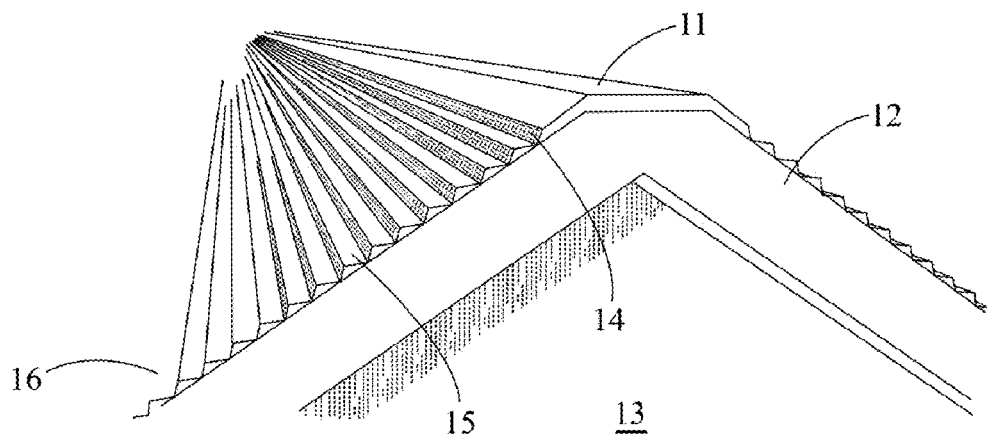
FIG. 3 is a perspective view of a roof system illustrating lighter reflective surfaces and darker absorptive surfaces with reference numbers to some of the aspects of this invention.
Figure 4:
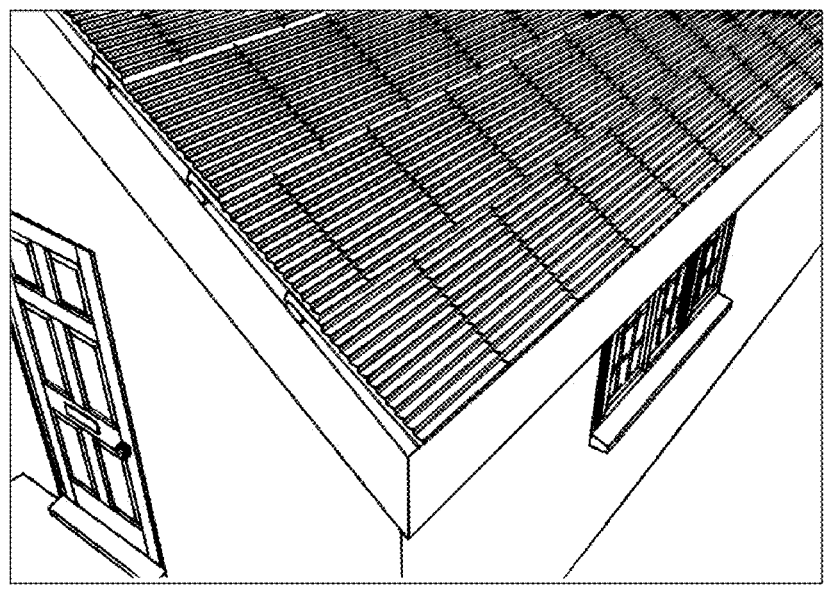
FIG. 4 is a perspective view of a roof system assembly of tiles of FIG. 17 illustrating light colored surfaces as highly reflective and darker colored surfaces as more absorptive and or ornamental surfaces.
Figure 5:
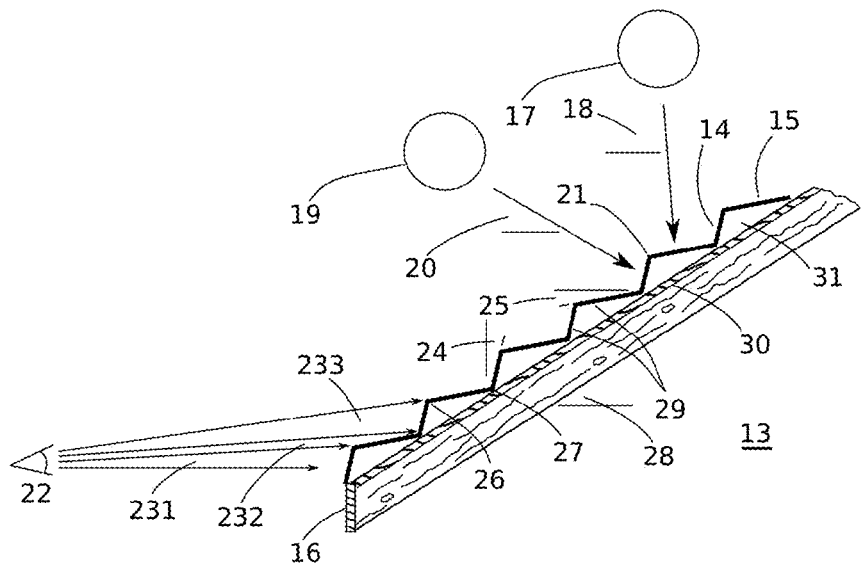
FIG. 5 is a sectional view of the invention with reference numbers identifying some of the aspects and design parameters that are of interest in this invention.

FIG. 3 and FIG. 5 illustrate a cladding system for a pitched roof with known slope angle (28) comprised of substantially horizontal cladding surfaces (15) each interconnected by and adjoining along a common edge (21) substantially vertical cladding surfaces (14). Substantially vertical surfaces are oriented at an angle to the vertical plane (24) and at an adjoining angle (26) to the substantially horizontal surfaces. Horizontal surfaces are inclined at an angle (25) to the horizontal plane to both promote water shedding and remain substantially hidden from perceptible view by persons viewing (232) from common viewing positions (22). Alternating horizontal and vertical surfaces repeat in the inclined direction and extending horizontally. FIG. 4 illustrates a roof system comprised of tile units according to the present invention. The tile units are assembled into courses or rows extending horizontally. Successive courses overlap the upper portion of the preceding course and repeat from the fascia (16) to the apex (11) of the roof.

Slope angles (25) of substantially horizontal surfaces of at least 3-deg are acceptable for drainage in order to shed water effectively. Insufficient drainage can cause pooling and infiltration that can serve to shorten the useful life of the building envelope. Slope angles are preferably about 8-deg for practical considerations to provide for actual roof pitch variability. The visual acuity of the human eye is generally accepted to be within the range of about 0.012-deg or 1.0 arc-min to about 0.007-deg or 0.4 arc-min. Visual acuity depends on the lighting conditions and increases with increasing light. In order to preclude perceptual viewing, the subtended angle (232) of the substantially horizontal surfaces in the field of view should be less than 0.012-deg and more preferably about 0.007-deg or 0.4 arc-min. Practical size limits exist for the traditional manufacture of cladding units. For example, concrete molded tiles are limited in feature size due to the material flow and fracture toughness. Sheetmetal shingles are also limited by traditional methods of manufacture such as stamping. Alternate construction methods whereby smaller features are protected from environmental fouling with a coating are possible.

Embodiments currently contemplated are disclosed herein as applied to a pitched roof inclined at an angle of 8:12 rise:run or 34-deg, a fascia (16) height of 3.5-m from ground level, and a roof peak height of approximately 6.7-m from ground level. Pitched roof angles typically range from 4:12 or 18-deg to 10:12 or 40-deg. Accordingly, a substantially horizontal surface oriented 8-deg from the horizontal for rain shedding is limited in width to about 3.6-cm in order to subtend an arc of 0.007-deg in the visual field and therefore remain substantially imperceptible to a person of approximately 2-m in height viewing at a distance of 20-m. The ability of a person to visually resolve objects of the same physical size decreases when viewed further away than 20-m. The viewing angle (231) increases for persons (22) standing closer to the fascia (16) precluding the horizontal surface from view entirely. The cladding therefore presents a uniform view of substantially vertical surfaces (233) to observers. Substantially horizontal surfaces of the present invention generally face the sun at high elevation angles and are hidden from common view. Substantially vertical surfaces generally face the sun at low elevation angles. It is an aspect of this invention that the substantially horizontal and hidden surfaces are utilized to modify the thermal and solar radiation performance of the cladding throughout the entire clad surface, in portions of the cladding, or in any combination thereof resulting in a multifunctional cladding without impact to the commonly viewable ornamental appearance.

Figure 23:
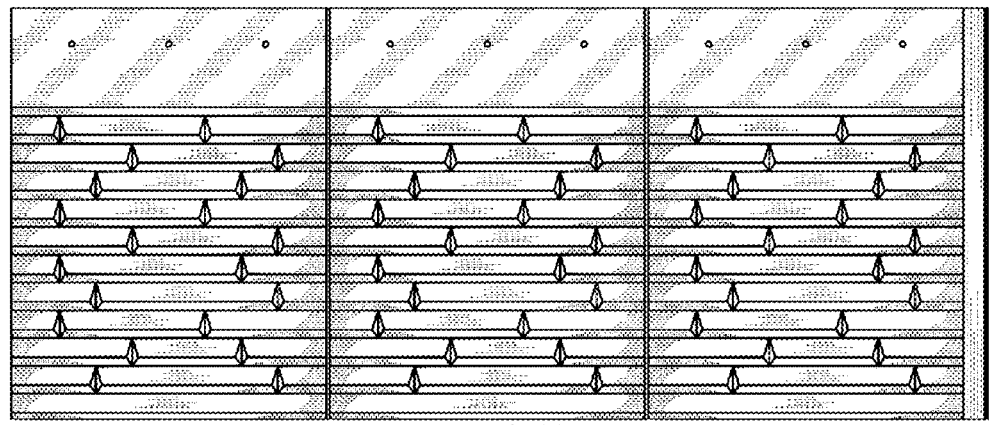
FIG. 23 is a roof system of several tiles in FIG. 17 illustrating one method of assembling a course of tiles as part of the roof system.

A first contemplated embodiment is illustrated in FIG. 4 and FIG. 17 through FIG. 23 as a molded tile such as from concrete or clay, approximately 36-cm wide by approximately 43-cm tall and comprised of 11 substantially horizontal surfaces at an adjoining angle of 100-deg to substantially vertical surfaces. Obtuse adjoining angles result preferable draft angles and therefore decrease complexity in the molding process. Aspects common to roofing tiles are easily incorporated such as side overlapping elements (39 and 40) for rain shedding and a batten stop (42). FIG. 23 illustrates the overlapping structure of a horizontal row or course of tile cladding units according to this invention. The cladding system in FIG. 4 is comprised of repeating courses of tile cladding units, each successive course in the upward inclined direction overlapping the upper or head portion of the preceding lower course. A notch or groove element (41) interrupts the common edge (21) of the substantially horizontal and vertical surfaces enhancing drainage and adding variety to the ornamental appearance of the cladding.

Figure 6:
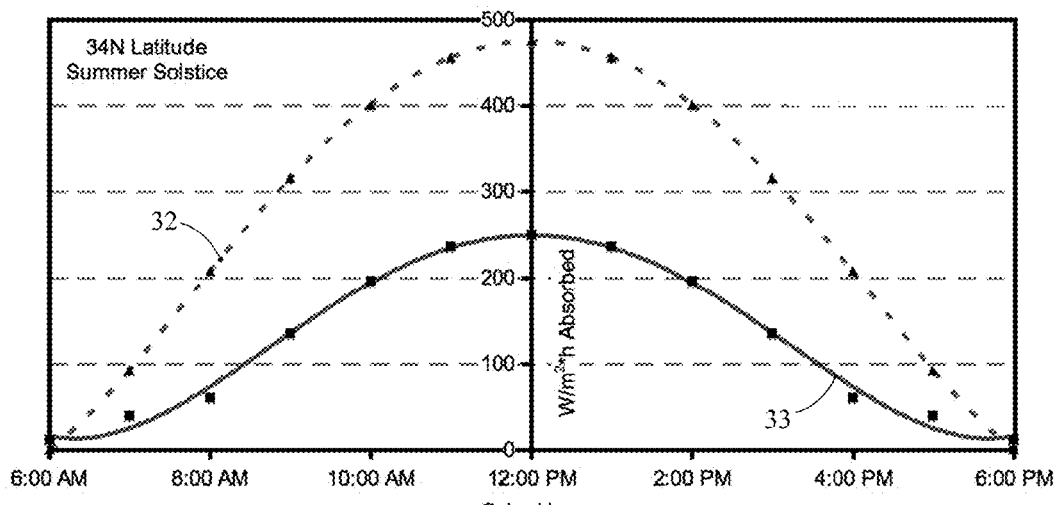
FIG. 6 is a graph of the predicted performance at 34-deg North latitude facing South during summer solstice.

Molded tiles are typically manufactured with integral color and or painted and then coated to inhibit water absorption and environmental fouling. Horizontal surfaces may be coated to reflect higher than about 0.5 and be emissive equal to or greater than about 0.5. It is an aspect of this invention that both reflectivity and emissivity properties of the substantially horizontal surfaces be considered of nearly equal importance in the design and selection of an exposed cladding surface for mitigating solar gain. Highly reflective and emissive coatings in use today such as paints can achieve nearly 0.85 reflectivity and greater than 0.7 emissivity. Suitable coatings such as epoxy paints with Titanium oxide pigment can be applied directly on the tile using conventional methods. FIG. 6 is a graph illustrating the predicted sun elevation responsive rate of solar absorption of a cladding according to this invention for 34 North latitude and on summer solstice (4). Horizontal surfaces are modeled as 0.84 reflective while vertical surfaces are modeled as 0.20 reflective. Predicted performance is illustrated as curve (33) and is compared to a roof cladding of traditional technology modeled as 0.48 reflective illustrated as curve (32). The model assumes incident angle absorptive and reflective performance variability is negligible. The largest difference in absorption rate occurs during the period bracketing solar noon when the sun elevation angle is highest. The horizontal surfaces may be matched in appearance to vertical surfaces for regions of the clad surface that are viewed from atypical viewing positions such as from above in a balcony. Therefore, the cladding according to the present invention is multifunctional while presenting a substantially uniformly ornamental appearance from common viewing positions.

Figure 7:
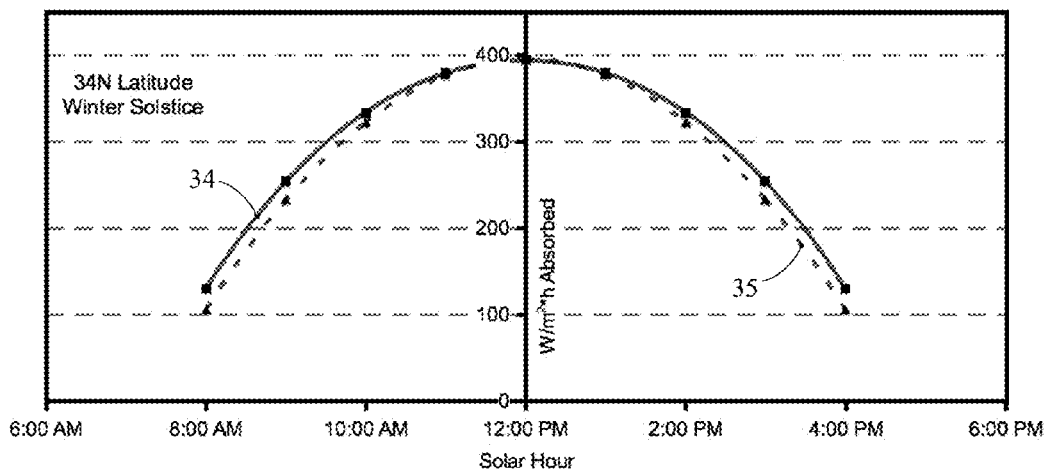
FIG. 7 is a graph of the predicted performance of one embodiment of this invention at 34-deg North latitude facing South during winter solstice.
Figure 8:
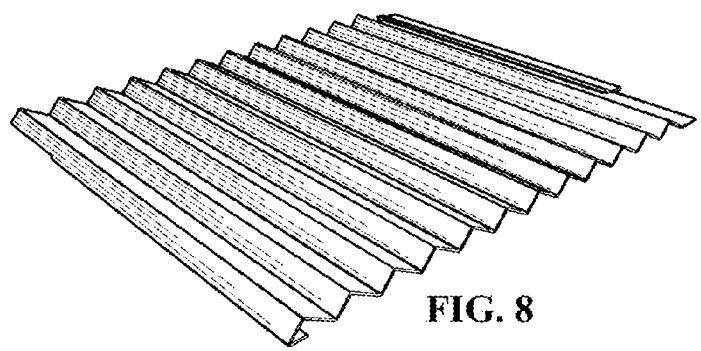
FIG. 8 is a front perspective view of a shingle according to this invention.
Figure 9:
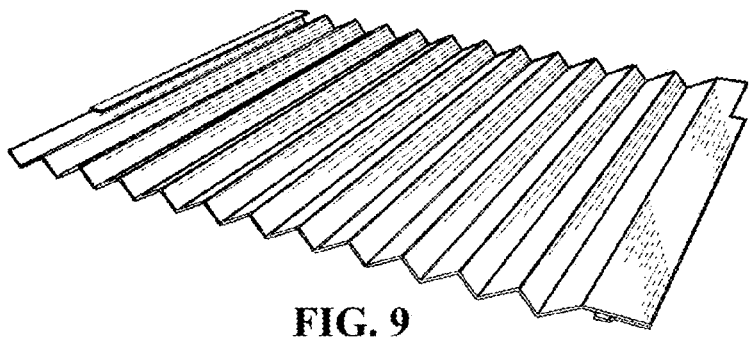
FIG. 9 is a back perspective view of the shingle in FIG. 8.

Unmodified molded vertical surfaces are suitably functional and acceptably ornamental surfaces. Natural or enhanced color and texture variation of the vertical surfaces further enhances ornamental appeal across the cladding. Decreasing solar absorptivity of the vertical surfaces to preferably less than 0.40 such as by painting can enhance wintertime solar gain. Materials with high absorptivity most commonly exhibit emissive values higher than 0.5 and is therefore typically not a limiting design parameter. FIG. 7 is a graph illustrating the predicted sun elevation responsive rate of solar absorption of a cladding according to this invention for 34-deg North latitude and on winter solstice (5). Predicted performance is illustrated as curve (34) and is compared to a roof cladding of traditional technology modeled as 0.48 reflective as illustrated as curve (35). Again, the model assumes incident angle absorptive and reflective performance variability is negligible.

Figure 15:
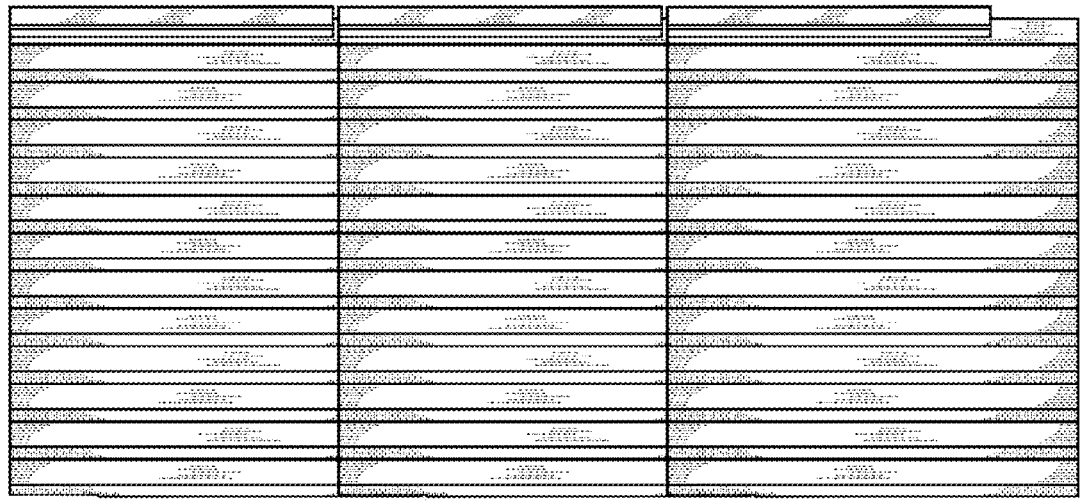
FIG. 15 is a partial view of a roof system of several shingles in FIG. 8 illustrating one method of assembling a course of shingles as part of a roof system.
Figure 16A:
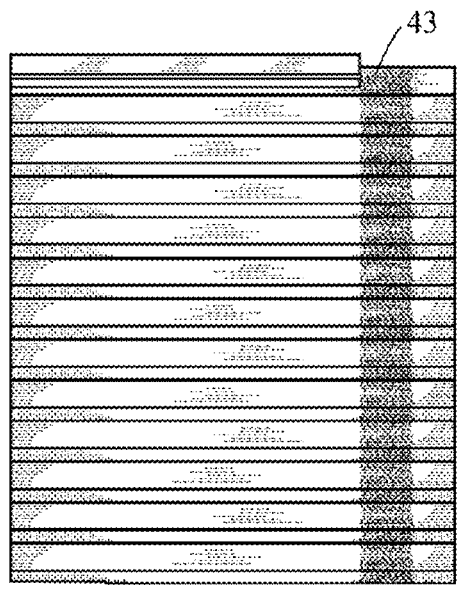
FIG. 16 is a front view (16A) and a back view (16B) of one embodiment as a shingle illustrating an ornamental accent or shadow line on the front surface as well as the location sealant might be used to increase the weather-tightness of the side lap joint.
Figure 16B:
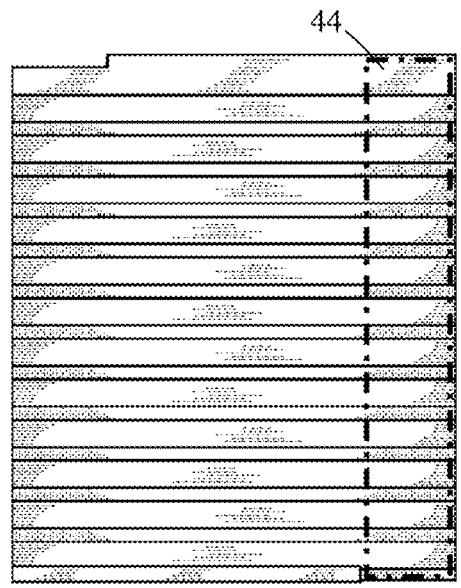
Figure 17:
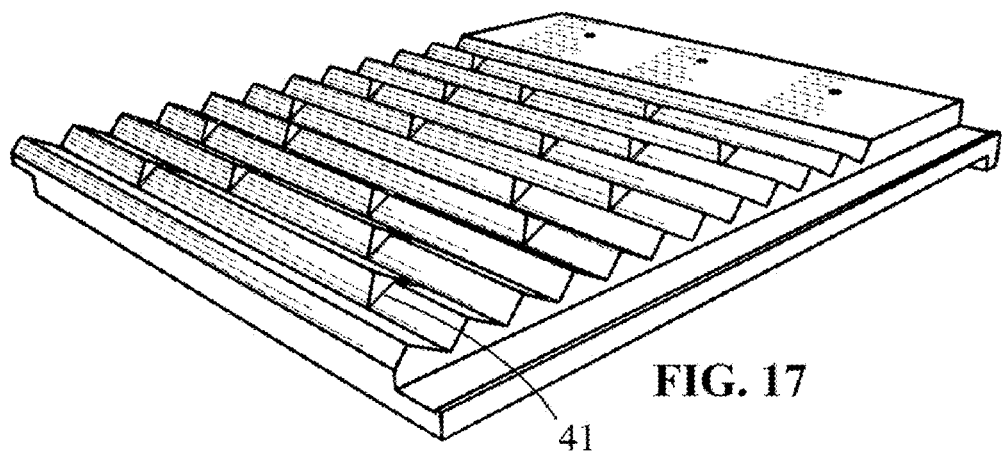
FIG. 17 is a front perspective view of a tile according to this invention.
Figure 19:
FIG. 19 is a top view of the tile in FIG. 17.
Figures 18, 21, 22:
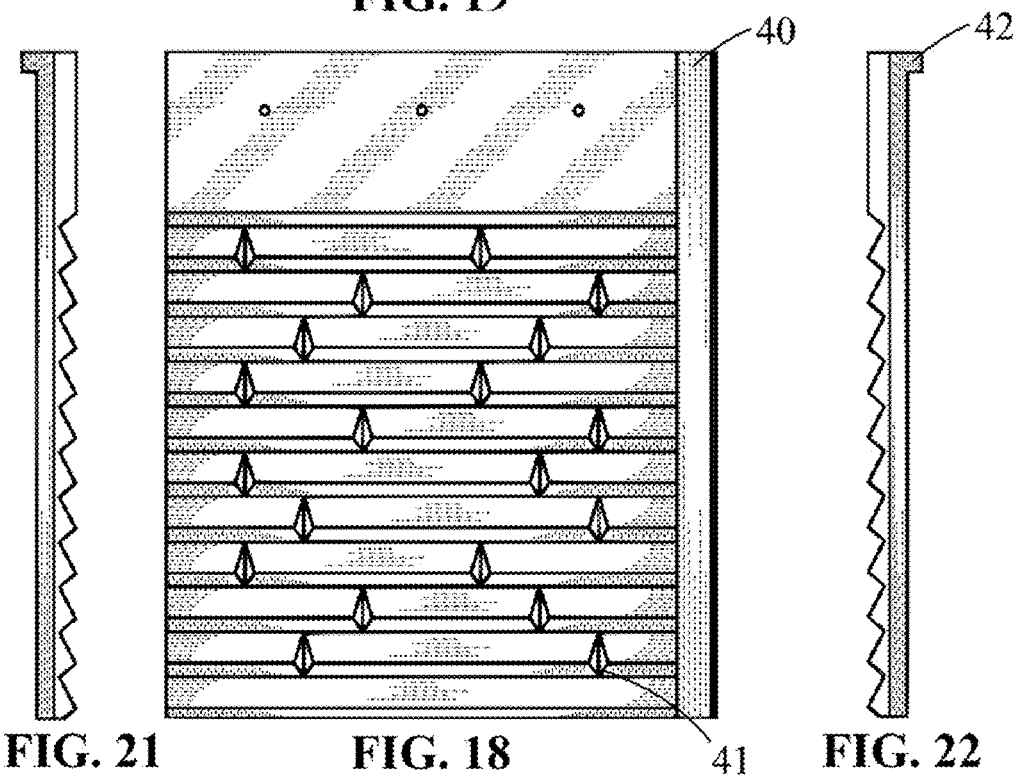
FIG. 18 is a front view of the tile in FIG. 17.
FIG. 21 is a left side view of the tile in FIG. 17.
FIG. 22 is a right side view of the tile in FIG. 17.
Figure 20:
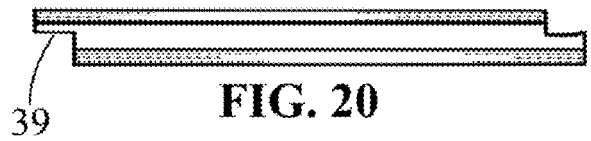
FIG. 20 is a bottom view of the tile in FIG. 17.

A second contemplated embodiment is shown in FIG. 8 through FIG. 16 as a sheetmetal shingle approximately 36-cm wide by approximately 43-cm tall comprised of 12 substantially horizontal surfaces at an adjoining angle of 100-deg to substantially vertical surfaces. Aspects common to roofing shingles are easily incorporated such as a head clip (36) and lower tab (38). A course of shingles is assembled by overlapping a portion (37) of an installed shingle with the next successive shingle as illustrated in FIG. 15. Overlapping pairs of surfaces align and nest upon assembly establishing substantially contiguous channels (31). The overlapping region between horizontally adjacent shingles is an effective barrier against water infiltration. A layer of adhesive or sealant (44) between shingles enhances resistance of the cladding against the effects of both water infiltration and wind damage. A darkened region (43) extending a portion beyond the overlapping region enhances visual delineation of each shingle by simulating depth such as by a shadow and therefore increases ornamental appeal. The shadow can be continuous or intermittent for additional visual variety. The darkened region can also be a layer of adhesive or sealant. Finally, a shingle cladding system is comprised of repeating courses of shingle cladding units, each successive course in the inclined direction with head clips of the preceding course interlocking lower tabs from the next successive course. An alternate method of horizontally joining cladding according to the present invention units is by use of integral vertical side flanges such as those used for a standing seam joining method. This is particularly suited to cladding panels, which typically extend from the roof peak (11) to the fascia (16). Horizontally adjacent panels abut and substantially contiguous channels (31) are aligned from panel to panel.

The shingle cladding system contacts the building substrate (30) at minimal contact areas (27) thereby minimizing thermal conduction between the cladding and the remainder of the building envelope. The cladding surfaces (29) exposed to the underlying substrate are preferably less than about 0.5 emissive to further reduce energy transfer from the cladding to the underlying building substrate during summer and greater than about 0.5 reflective to minimize energy transfer from the conditioned space (13) to the cladding in the winter. The increased volume of air between the cladding and the underlying substrate (30) over traditional cladding technologies as a result of the channels (31) acts as an effective thermal insulator. Additional insulation such as a phase change material dramatically enhances thermal insulation and is also currently contemplated.

The cladding according to the present invention is multifunctional and substantially uniformly ornamental when viewed from common viewing positions regardless of horizontal surface properties. Horizontal surfaces remain hidden from perceptible view and are therefore not limited to ornamental constraints. Substantially horizontal and perceptibly hidden surfaces and the underlying channels can be utilized together to advantageously exchange energy between the cladding and the environment, convert solar energy into another form of energy as well as move energy into, out of, and throughout the cladding further extending functionality.

Figure 24:
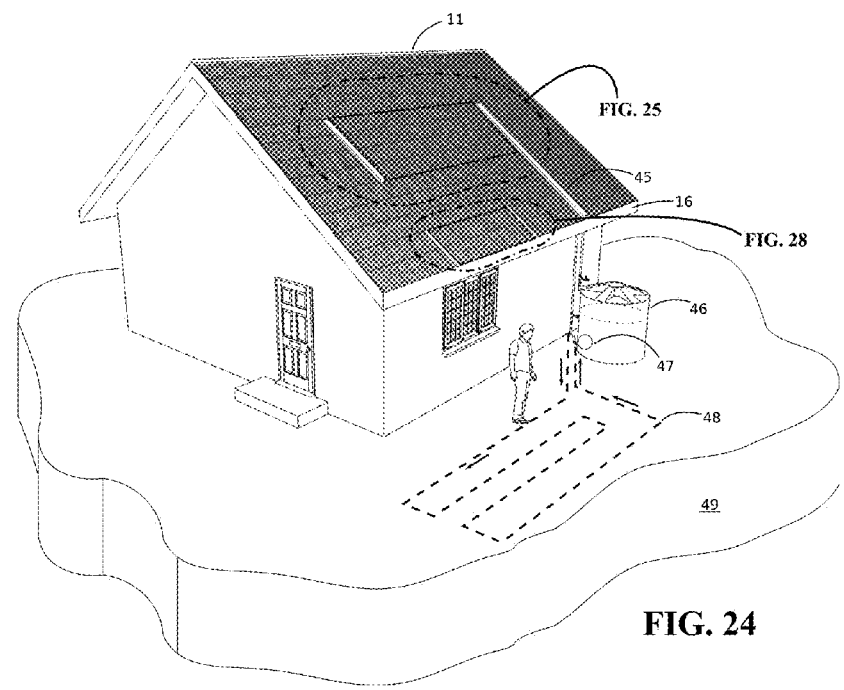
FIG. 24 is a perspective view of some of the components of the cladding and other aspects of such a system as might be constructed.
Figure 27:
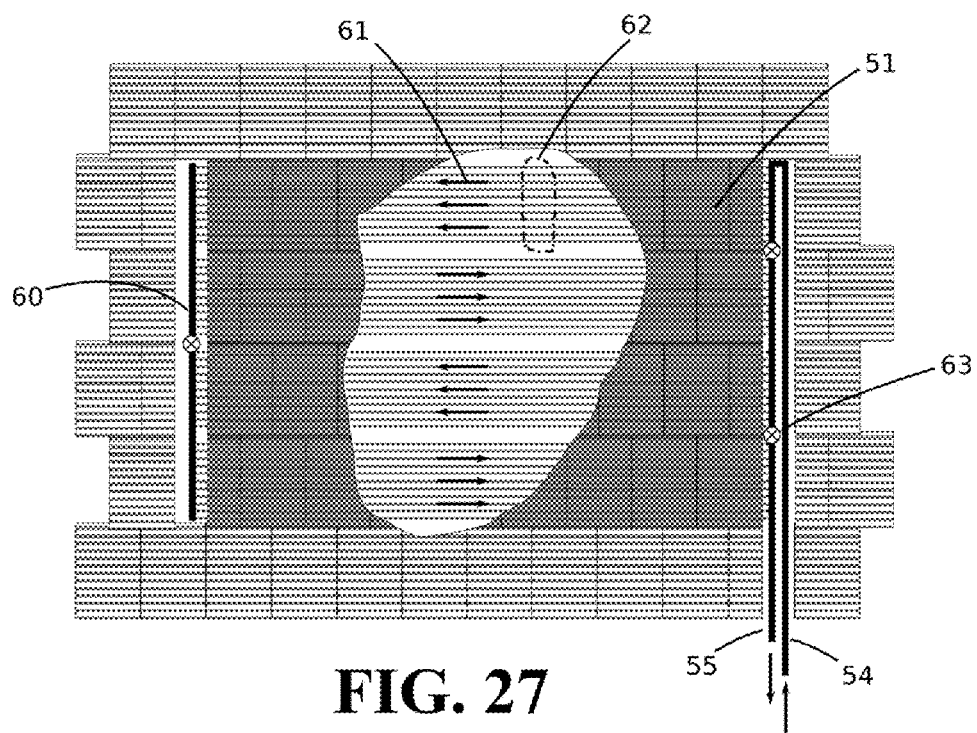
FIG. 27 is a top view of a solar thermal cladding region as a roof with tubes or pipes exposed.

FIG. 24 illustrates a third embodiment of the cladding currently contemplated as a cladding system, which includes a region of the cladding shown in detail in FIG. 25. A region (51) of the building cladding (52) is illustrated in FIG. 25 whereby horizontal surfaces (15) exhibit higher absorptivity than the remainder of the building cladding horizontal surfaces. FIG. 26 is a cross sectional view of the region in FIG. 25. FIG. 26A illustrates the cladding (51) assembled on an inclined building substrate (30). FIG. 26B illustrates an exploded view of the same section in FIG. 26A. A plurality of tubes (56) or other means for fluid or gas containment and transport is in thermal communication with interior surfaces (29) of the cladding and located within the horizontal channels (31). A working fluid circulated in the tubes absorbs energy from the cladding, which is then transported away from the cladding. As but some examples of working fluids include air, water, glycerin, polypropylene glycol, polyethylene glycol or a glycol-water mixture. FIG. 27 shows the same region (51) of the cladding with a portion of the cladding units removed illustrating the underlying tubes (56) and describes one method of working fluid routing in the cladding system whereby fluid tube sets are arranged in counter flow and head pressure assists flow through the tubes. A set of tubes associated with a single course of cladding units (62) direct fluid flow in the same direction (61). A tube manifold (60) in fluidic communication with at least one set of tubes associated with one course of cladding units and serves to direct flow into or out of each set. Manifold segments are attached and separated by a plug or a valve (63). A fluid inlet (54) and outlet (55) are connected in fluidic communication with fluid flow equipment such as a pump (47), reservoirs (46), and or loop heat pipes (48) in the ground (49). The system described is a heat exchanger that is utilized to transport thermal energy into or out of the cladding system. A radiant heat barrier (59) and a waterproofing layer (58) reduce energy transfer into the conditioned space as well as preclude water infiltration in case of a fluidic leak. Tube manifolds may be housed and covered by means of a conduit (45, 50) in order to increase ornamental appeal and provide a weather-resistant covering. The conduit is positioned generally perpendicular to the channels in the cladding. The conduit is in spatial communication with the channels in order to facilitate routing of fluid containment equipment, electrical energy routing equipment, or air while presenting an acceptable ornamental aesthetic.

Figure 28:
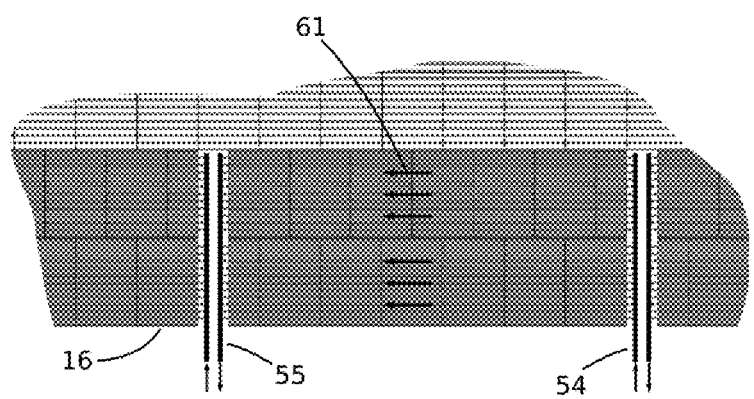
FIG. 28 is a top view of a solar thermal region as a roof that might be constructed to mitigate the formation of ice dams such as on the eaves of a roof.

FIG. 24 illustrates a fourth embodiment of the cladding system currently contemplated, which includes a region of the cladding shown in detail in FIG. 28. A cladding region over the roof eaves terminating at the fascia (16) of the building is illustrated in FIG. 28 and is typically where ice dams form in cold climates. A cladding according to this invention mitigates the formation of ice dams by circulating a working fluid (61) at a temperature sufficiently above 0-deg Celsius under the cladding in order to preclude water freezing and or melting frozen water on the cladding. Fluid input (54) is preferably above 30-deg Celsius and the fluid output (55) is preferably above 5-deg Celsius and even more preferably above 10-deg Celsius. An alternative heating means utilizes electrical heaters positioned in the channels (31) in thermal communication with the cladding surfaces (29) of at least the courses of cladding units directly over the eaves. Electrical wires service the heaters and are routed within the channels

(31) and conduit (45, 50) to a power source. Electrical heaters serviced by wires can be located away from the power source with little energy loss to the environment in energy transport and can be very precisely controlled.

A fifth embodiment currently contemplated utilizes means to generate electrical energy from incident solar radiation affixed to or as the substantially horizontal surfaces. As an example, photovoltaic devices may be affixed to the surfaces (15) of the shingle illustrated in FIG. 8. Any combination of the entire clad building surface or selected regions such as the region (51) shown in FIG. 25 may be configured to generate electricity especially when the sun is at high elevation angles. Electrical wires and components such as inverters, and connectors are housed and routed within the channels (31) of the cladding and are then routed through the conduits (45,50) thereby minimizing substrate penetrations. Electrical connections can also be established within the overlapping region (37) of adjacent shingles. The outward facing surfaces of conduits can also be configured to generate electricity such as by photovoltaic devices (53). Energy conversion from one form to another generates some loss in the form of heat. Waste heat in building integrated or mounted systems can degrade system performance, reduce the life cycle of system components as well as heat the building envelope. A working fluid circulated such as by a pump (47) through tubes (56) in the channels (31) under the means for generating electrical energy is utilized to transport heat away from the cladding to be stored in a reservoir (46) for later use or removed from the system such as through another heat exchanger such as a ground loop heat pipe (48). Alternatively, air in the channels (31) can be similarly circulated such as by a fan and then exhausted directly into the environment. Therefore, the system described according to the present invention is a multifunctional yet substantially uniformly ornamental cladding.

Figure 29:
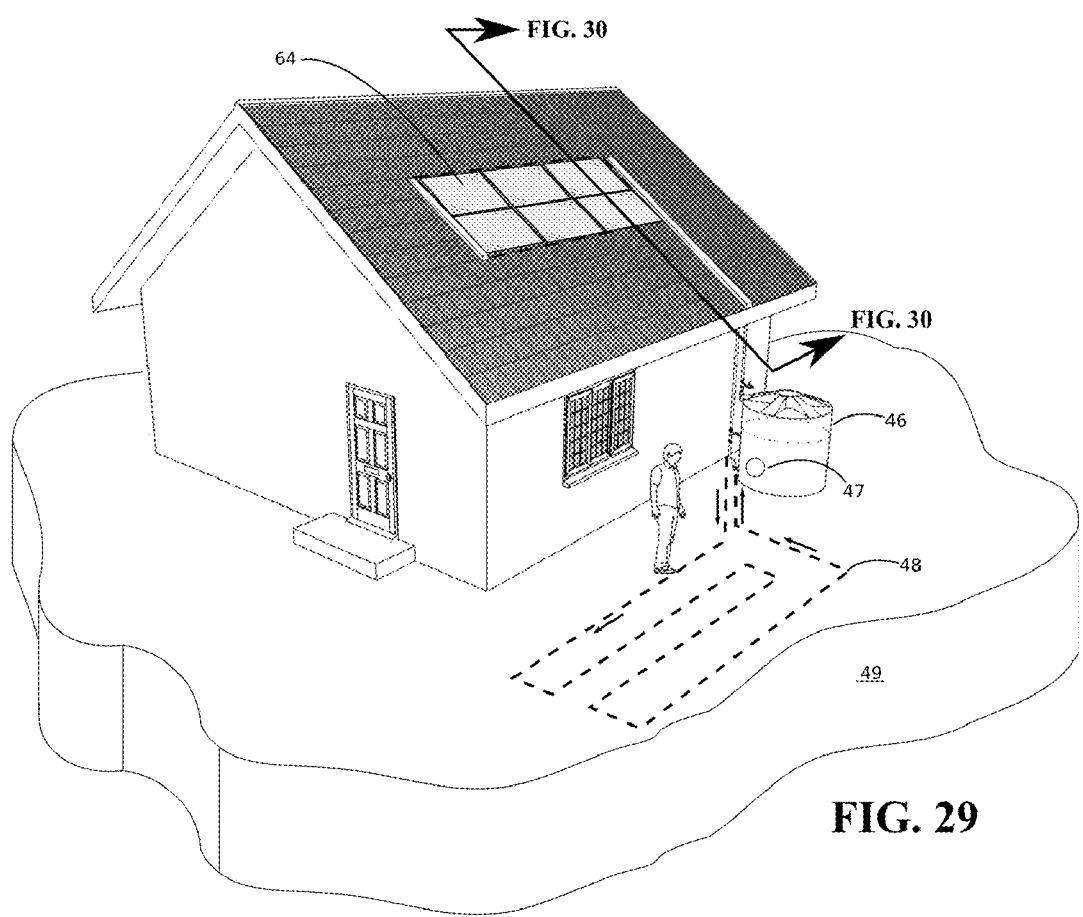
FIG. 29 is a perspective view of some of the components of a solar thermal cladding as might be constructed to collect and transport waste heat from photovoltaic, solar thermal collectors and or other waste heat producing processes installed on the cladding system.
Figure 30:
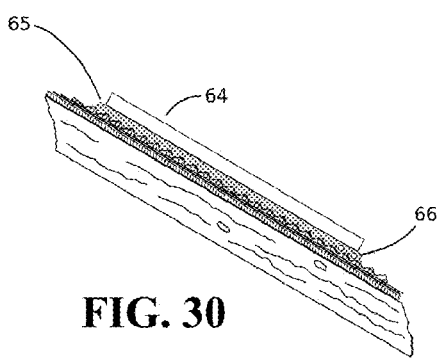
FIG. 30 is a sectional view of solar thermal cladding and system of FIG. 29.

A sixth embodiment currently contemplated is illustrated in FIG. 29 whereby waste heat generated from discrete solar thermal, photovoltaic panels (64), and or other heat-generating roof-mounted equipment is transported away from the panels through the cladding. FIG. 30 shows a cross section of FIG. 29 in which a mounting interface (65) physically and or thermally couples the panels to the cladding. Utilities such as tubes, pipes and wires are routed (66) through the mounting interface. Conduit (45, 50) abutting or near the mounting interface provides means to route the panel utilities substantially hidden from view and away from the degrading effects of the weather and environmental fouling.

Figure 31:
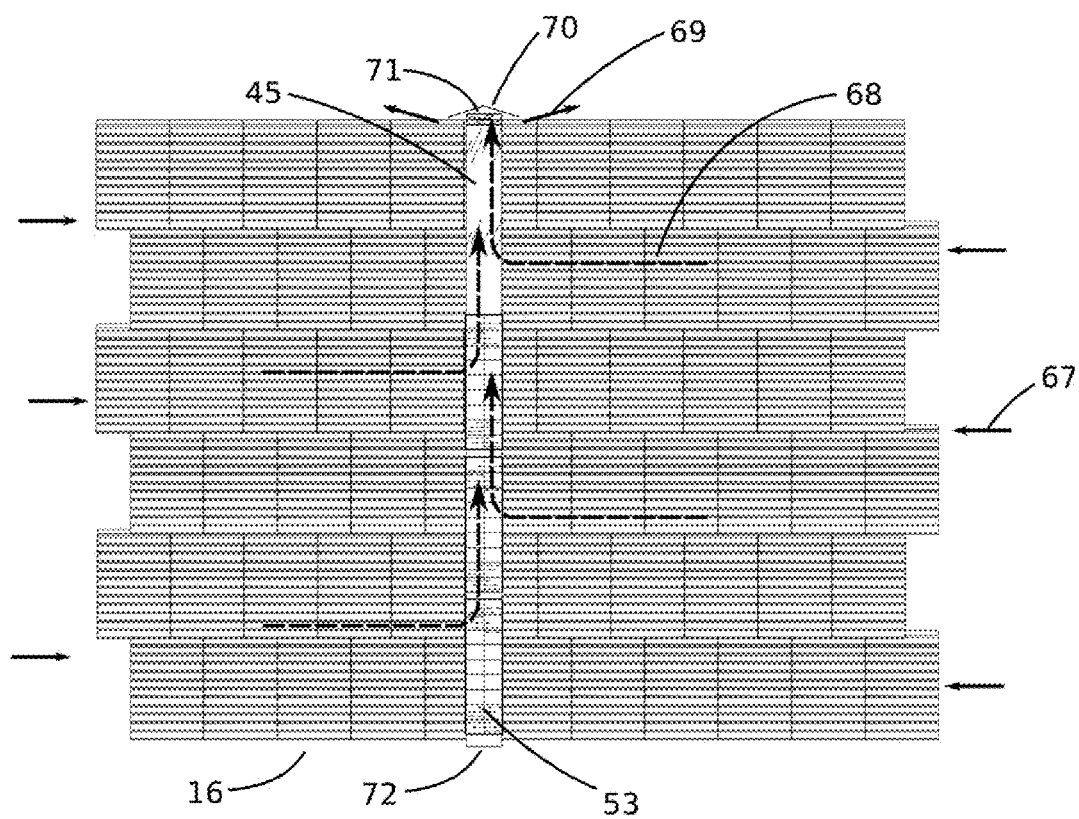
FIG. 31 is a top view of a solar thermal region as a roof as might be constructed to utilize air to transport absorbed heat energy from the cladding such as a solar chimney.

A seventh embodiment currently contemplated is illustrated in FIG. 31 whereby the building cladding is naturally or forcibly ventilated with air. Natural or forced ventilation of building cladding is advantageous both in the summer season as well as in the winter season. Ventilation reduces summer time cladding temperatures and speeds drying time during winter to reduce mold growth and envelope degradation. Air entering open or screened channel (31) ends such as at the beginning or end of a course (67) is drawn (68) into a conduit (45) naturally such as by a chimney effect or forcibly such as by a fan (71). An air inlet (72) in the conduit near the fascia (16) enhances the natural ventilation. Cooler fresh air is heated along the path from entry (67) to exit (69) thereby removing energy absorbed in the cladding and underlying substrate. A vent cap (70) precludes rain and pest infiltration.

As can be easily understood from the foregoing, the basic concepts of this invention may be embodied in a variety of ways. It involves both building engineering, design and materials analysis techniques as well as devices to accomplish the appropriate manufacturing and installation. In this application, the building engineering and design techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "reflective surface" should be understood to encompass disclosure of the act of "reflecting"—whether explicitly discussed or not—and, conversely, were there effectively disclosure of the act of "reflecting", such a disclosure should be understood to encompass disclosure of a "reflective surface" and even a "means for reflecting". Such changes and alternative terms are to be understood to be explicitly included in the description.

Any patents, publications, or other references mentioned in this application for patent are hereby incorporated by reference. And, the applicant(s) should be understood to have support to claim and make a statement of invention to at least: i) each of the building covering devices and apparatus as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, xii) each potentially dependent claim or concept as a dependency on each and every one of the independent claims or concepts presented, and xiii) all inventions described herein.

In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 715 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

The following documents are incorporated by reference.

U.S. Patent Documents

| Reference | Date | Inventor |
|---|---|---|
| 3,001,331 | 1961 Sep. 26 | Brunton |
| 4,111,188 | 1978 Sep. 05 | Murphy, Jr. |
| 5,303,525 | 1994 Apr. 19 | Magee |
| 5,511,537 | 1996 Apr. 30 | Hively |

Other Documents

1. US Published Application 2006/0288652 A1 published 2006-12-28 by Gurr
2. WIPO Published Application WO 2006/1119567 A1 published 2006-11-16 by Totoev

I claim:

1. A multifunctional building cladding adapted for inclined building surfaces comprising a plurality of paired surfaces exposed to the environment wherein:
   a. one surface of said pair is oriented substantially horizontally and tilted from the horizontal plane for drainage and the second surface of said pair oriented substantially vertically and tilted toward said substantially horizontal surface,
   b. said substantially horizontal surface having an outer edge and said substantially vertical surface having an upper edge adjoining the outer edge of said substantially horizontal surface forming an obtuse adjoining angle,
   c. said paired surfaces repeat in the inclined direction and extend horizontally, and
   d. said building cladding having a first portion of the substantially horizontal surface area differ in visual appearance, composition, reflectivity, emissivity, and or function in any combination from at least a second portion of said substantially horizontal surface area.

2. The multifunctional building cladding in claim 1 wherein said building cladding having a first portion of the substantially vertical surface area differ in visual appearance, composition, reflectivity, emissivity, and or function in any combination from at least a second portion of said substantially vertical surface area.

* * * * *